(No Model.)

W. C. ESSEX & A. REAME.
MACHINE FOR OPENING OYSTERS.

No. 589,548. Patented Sept. 7, 1897.

WITNESSES:
Joseph V. Flynn,
James B. Marlow

INVENTORS
William C. Essex
and Albert Reame
BY F. W. Barker
ATTORNEY.

United States Patent Office.

WILLIAM CHARLES ESSEX AND ALBERT REAME, OF HULL, ENGLAND.

MACHINE FOR OPENING OYSTERS.

SPECIFICATION forming part of Letters Patent No. 589,548, dated September 7, 1897.

Application filed April 28, 1896. Serial No. 589,390. (No model.)

*To all whom it may concern:*

Be it known that we, WILLIAM CHARLES ESSEX, residing at 29 Mayfield Street, and ALBERT REAME, residing at 6 Alexandra Avenue, Mayfield Street, Hull, in the county of York, England, subjects of the Queen of Great Britain and Ireland, have invented an original Machine for Opening Oysters, of which the following is a specification.

The object of the invention is the provision of an original machine for opening oysters and other bivalvular mollusks without handling the oysters during the operation of opening, and so avoid danger of wounding and cutting the operator.

Our machine enables oysters to be safely and expeditiously opened, including all those which would not be safe or profitable to open with an ordinary oyster-knife.

In carrying our invention into practice we construct a machine of any suitable metal with a base of suitable shape. At one end of the base a recess is formed suitable for the oyster to rest in and be held in a horizontal position by means of a ring also pivoted horizontally, the necessary pressure required for holding the oyster being applied by means of a hand-lever. This lever can also be made to work by foot-power and be controlled by a spring. At the other end of the base is an inclined pillar or column fixed at a suitable angle. This pillar or column carries a spearheaded knife attached to a spindle capable of being raised or lowered, and to which can be imparted a combined stabbing and rotary action by means of a hand-lever.

To open an oyster, the oyster is held or gripped by a hand-lever in the recess of the machine. The spear-headed knife is then made to enter the mouth of the oyster, and when entered the knife and spindle is given a half-turn, causing the two shells to open, the pressure of the grip being gently released at the same time.

The machine can also be constructed so as to open the oyster while held in a vertical position. This method, however, causes the oyster liquor to be lost, and is not recommended.

Figure 1:
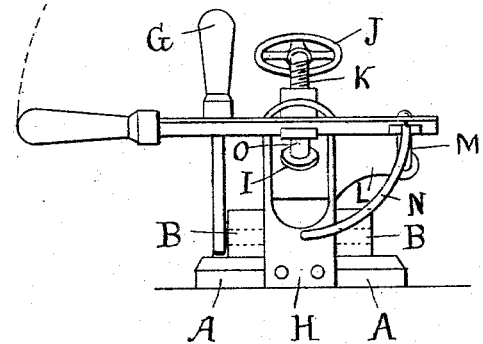
Figure 2:
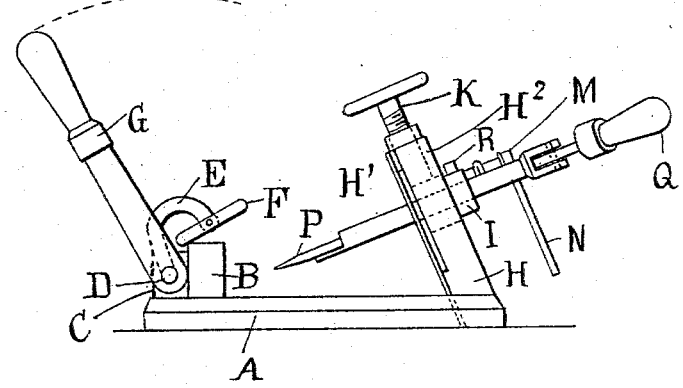

Referring to the drawings which form a part of this specification, Figure 1 represents an end elevation, and Fig. 2 represents a side elevation, of a machine constructed according to our invention.

A is a base-plate of any suitable shape, but preferably rectangular and arranged to be screwed down or otherwise secured to a counter or table. In Fig. 2, at the left-hand end of the base A is a recess which lies between two pillars B. The back of these pillars form bearings C for a shaft D, which is fixed in a horizontal position across the end of the base. The shaft D carries two curved arms E, supporting a grip-ring F, which is pivoted on the arms E. The grip F is manipulated by means of a lever G, which, on being moved from left to right, causes the grip-ring F to descend on the top shell of the oyster, holding it firmly in the recess in the base A.

At the right-hand end of the base A is fixed a column or pillar H, inclined at about twenty-four and one-half degrees from the vertical. This pillar is made in two parts $H'$ and $H^2$, forming a guide for the bearing and arm L. (Shown in Fig. 1.)

I is a bearing for the spindle O, to which is fixed a spear-headed knife P, which opens the oysters. Spindle O can be raised or lowered in the pillar H by means of a hand-wheel J and screw K, which work through the top of the pillar H. To the right of the bearing I, Fig. 1, projects an arm L, which carries a pillar M, which in turn supports a quadrant N. To the upper end of the spindle O is connected a hand-lever Q, the fulcrum of which is the quadrant-arm N, along which the end of the lever can slide, it being slotted for that purpose. On the top of the bearing I is fixed a spring and plunger R, which passes through the bearing I and rests on spindle O. When the spindle is drawn to the right, the plunger R falls into a groove in the spindle at that end nearest the knife, thereby preventing the spindle from slipping when not in use.

Having now described our invention, what we claim as new, and desire to secure by Letters Patent, is—

1. In a machine for opening oysters and other similar mollusks, a fixed knife P, a spindle O and hand-lever Q, to operate the said knife P, and means for adjusting said knife, comprising a hand-wheel J, and screw K, substantially as described.

2. In a machine for opening oysters and other similar mollusks, having a fixed knife P and a spindle O with hand-lever Q to operate said knife, a gripping mechanism consisting of a shaft D, two curved arms upon said shaft, a grip-ring F supported by said arms E, and a lever G for operating said mechanism, substantially as described.

In witness whereof we have hereunto set our hands in presence of two witnesses.

WILLIAM CHARLES ESSEX.
ALBERT REAME.

Witnesses:
ALFRED MILLIGAN SEVERS,
FREDERICK WILLIAM BRICKNELL.